United States Patent
Hernandez et al.

(10) Patent No.: US 11,470,434 B2
(45) Date of Patent: Oct. 11, 2022

(54) SYSTEM AND METHOD FOR ESTIMATING TEMPERATURE OF VOICE COIL

(71) Applicant: Texas Instruments Incorporated, Dallas, TX (US)

(72) Inventors: David Hernandez, Fort Worth, TX (US); Amit Goyal, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/319,061

(22) Filed: May 12, 2021

(65) Prior Publication Data
US 2021/0409885 A1 Dec. 30, 2021

Related U.S. Application Data

(60) Provisional application No. 63/045,414, filed on Jun. 29, 2020.

(51) Int. Cl.
*H04R 29/00* (2006.01)
*H04R 9/06* (2006.01)
(Continued)

(52) U.S. Cl.
CPC .......... *H04R 29/003* (2013.01); *G01K 13/00* (2013.01); *H04R 3/007* (2013.01); *H04R 9/06* (2013.01); *G01K 2207/00* (2013.01)

(58) Field of Classification Search
CPC ............... G01K 13/00; G01K 2207/00; G01K 2217/00; G01K 7/16; H04R 29/003; H04R 3/007; H04R 9/06
See application file for complete search history.

(56) References Cited

U.S. PATENT DOCUMENTS 4,943,956 A 7/1990 Noro
5,086,473 A 2/1992 Erath
(Continued)

OTHER PUBLICATIONS

Bruno Defraene, et al., "Embedded-Optimization-Based Loudspeaker Precompensation Using a Hammerstein Loudspeaker Model", IEEE/ACM Transactions on Audio, Speech, and Language Processing, vol. 22, No. 11, Nov. 1, 2014, 12 pgs.
(Continued)

*Primary Examiner* — Kile O Blair
(74) *Attorney, Agent, or Firm* — Mark A. Valetti; Charles A. Brill; Frank D. Cimino (57) ABSTRACT

A system for determining the temperature of a voice coil of a speaker includes a first pre-emphasis filter which has an input coupled to receive a digitized current sense signal. The first pre-emphasis filter applies a gain to signal components at a selected frequency band and provides a pre-emphasized current sense signal. The system includes a second pre-emphasis filter which has an input coupled to receive a digitized voltage sense signal. The second pre-emphasis filter applies a gain to the signal components at the selected frequency band and provides a pre-emphasized voltage sense signal. The system includes a first quantizer module configured to map the pre-emphasized signal to a quantized current sense signal, and includes a second quantizer module configured to map the pre-emphasized voltage sense signal to a quantized voltage sense signal.

23 Claims, 5 Drawing Sheets

(51) Int. Cl.
*H04R 3/00* (2006.01)
*G01K 13/00* (2021.01)

(56) References Cited

U.S. PATENT DOCUMENTS

| | | |
|---|---|---|
| 5,430,802 A | 7/1995 | Page |
| 8,942,381 B2 | 1/2015 | Guatama |
| 2006/0104451 A1 | 5/2006 | Browning et al. |
| 2006/0126857 A1 | 6/2006 | Pavlov et al. |
| 2007/0269055 A1 | 11/2007 | Erath |
| 2009/0003628 A1 | 1/2009 | Kim |
| 2010/0246848 A1 | 9/2010 | Stanley |
| 2011/0228945 A1 | 9/2011 | Mihelich et al. |
| 2012/0154037 A1 | 6/2012 | Pfaffinger et al. |
| 2020/0348249 A1* | 11/2020 | Marchais ............... H04R 3/007 |

OTHER PUBLICATIONS

Varun Chopra, "Active Leak Compensation in Small Sized Speakers Using Digital Signal Processing", Paper, Audio Engineering Society Convention Paper 6605, Oct. 7-10, 2005, 6 pgs.

Benno Krabbenborg, et al., "Closed-Loop Class-D Amplifier with Nonlinear Loop Integrators", IEEE Journal of Solid-State Circuits, vol. 45, No. 7, Jul. 2010, 10 pgs.

* cited by examiner

SYSTEM AND METHOD FOR ESTIMATING TEMPERATURE OF VOICE COIL

CROSS REFERENCE TO RELATED APPLICATION

This application claims priority to U.S. Provisional Application No. 63/045,414, filed Jun. 29, 2020, entitled "Pre-Emphasis Equalization of Current and Voltage Sense Data for Optimizing the Bit Allocation in the Sense Path for Smart Amp Systems", which is hereby incorporated by reference in its entirety.

TECHNICAL FIELD

This description relates generally to systems and methods for monitoring and estimating the temperature of a voice coil of a speaker.

BACKGROUND

In audio circuitry, an amplifier is typically used to drive one or more speakers. To protect a speaker from overheating, the temperature of a voice coil of the speaker is monitored and estimated, and based on the estimated temperature, the amplifier's power level is adjusted to protect the speaker from overheating.

In many systems, the temperature of a voice coil is estimated by determining the resistance of the voice coil at very low frequencies (e.g., 1-30 Hz). The resistance of the voice coil corresponds to its temperature. A small amplitude signal, known as a pilot tone signal, is super-imposed on an audio signal, and the super-imposed signal is driven through the voice coil. The resulting voltage across the voice coil and the current through the voice coil are sensed and the sensed data is transmitted over a communication interface to a processor which determines the resistance based on the sensed data. In some applications, prior to transmission the sensed data is compressed to 8-bits due to the bandwidth of the communication interface. As a result, few quantization levels are allocated to represent the pilot tone signal, which often introduces error to the estimated temperature.

SUMMARY

In one aspect, a system for determining the temperature of a voice coil of a speaker includes a first input coupled to receive a current sense signal indicative of the current through the voice coil when the voice coil is being driven by signal components at first and second frequency bands and includes a second input coupled to receive a voltage sense signal indicative of the voltage across the voice coil. The system includes a first analog-to-digital (A/D) converter which has an input coupled to receive the current sense signal. The first A/D converter provides a digitized current sense signal. The system includes a second A/D converter which has an input coupled to receive the voltage sense signal. The second A/D converter provides a digitized voltage sense signal. The system includes a first pre-emphasis filter which has an input coupled to receive the digitized current sense signal. The first pre-emphasis filter applies a gain to the signal components at the second frequency band and provides a pre-emphasized current sense signal. The system includes a second pre-emphasis filter which has an input coupled to receive the digitized voltage sense signal. The second pre-emphasis filter applies a gain to the signal components at the second frequency band and provides a pre-emphasized voltage sense signal. The system includes a first quantizer module which has an input coupled to receive the pre-emphasized current sense signal. The first quantizer module maps the pre-emphasized signal to a quantized current sense signal. The system includes a second quantizer module which has an input coupled to receive the pre-emphasized voltage sense signal. The second quantizer module maps the pre-emphasized signal to a quantized voltage sense signal.

In an additional aspect, the first and second pre-emphasis filters apply an attenuation to the signal components at the first frequency band.

In an additional aspect, the system includes a first de-emphasis filter which has an input coupled to receive the quantized current sense signal. The first de-emphasis filter applies an attenuation to the signal components at the second frequency band and provides a de-emphasized current sense signal. The system includes a second de-emphasis filter which has an input coupled to receive the quantized voltage sense signal. The second pre-emphasis filter applies an attenuation to the signal components at the second frequency band and provides a de-emphasized voltage sense signal. The system includes an impedance estimation module which has a first input coupled to receive the de-emphasized current sense signal and includes a second input coupled to receive the de-emphasized voltage sense signal. The impedance estimation module determines an estimated resistance of the voice coil based on the de-emphasized voltage and current sense signals. The system includes a temperature estimation module configured to determine an estimated temperature of the voice coil based on the resistance of the voice coil.

In an additional aspect, the first and second de-emphasis filters apply a gain to the signal components at the first frequency band.

In an additional aspect, a method of determining the temperature of a voice coil of a speaker includes driving the voice coil with signal components at first and second frequency bands. The method includes generating a current sense signal indicating current through the voice coil and generating a voltage sense signal indicating a voltage across the voice coil. The method includes digitizing the current and voltage sense signals. The method includes pre-emphasizing the digitized current and voltage sense signals by applying a first attenuation to the signal components at the first frequency band and applying a first gain to the signal components at the second frequency band. The method includes mapping the pre-emphasized current and voltage sense signals to quantized current and voltage signals. The quantized current and voltage sense signals have a smaller set of values than the respective pre-emphasized current and voltage signals. The method includes transmitting the quantized current and voltage sense signals over an I2S serial bus interface.

In an additional aspect, the method includes receiving the quantized current and voltage sense signals and de-emphasizing the current and voltage sense signals by applying a second gain to the signal components at the first frequency band and applying a second attenuation to the signal components at the second frequency band. The method includes estimating the resistance of the voice coil based on the de-emphasized current and voltage sense signals. The method includes determining an estimated temperature of the voice coil based on the resistance of the voice coil.

BRIEF DESCRIPTION OF THE DRAWINGS

The same reference numerals or other reference designators are used in the drawings to designate the same or similar (by function and/or structure) features.

DETAILED DESCRIPTION

Figure 1:
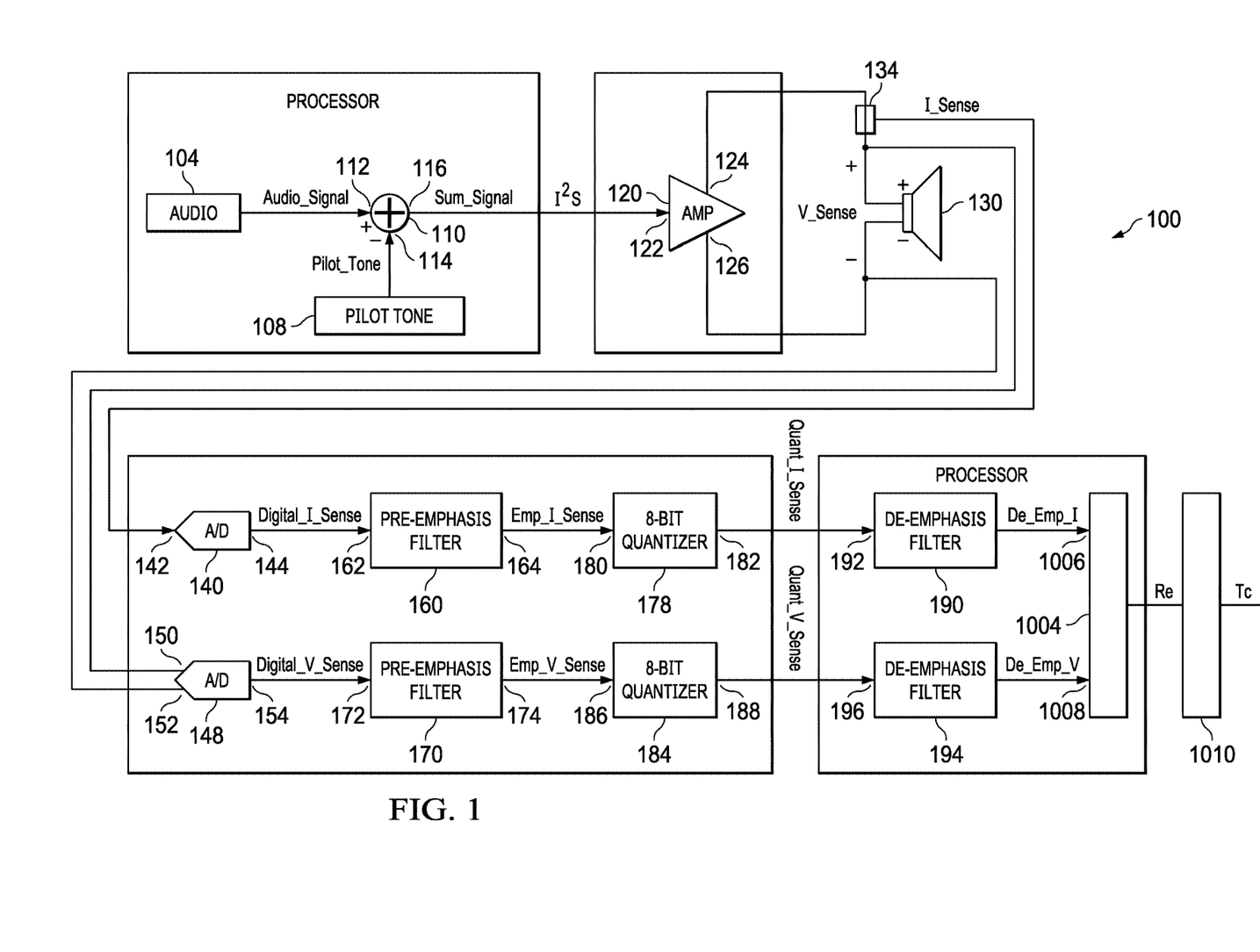
FIG. 1 is a block diagram of a system of an example embodiment.

FIG. 1 is a block diagram of a system 100 of an example embodiment. The system 100 is configured to estimate the temperature of a voice coil of a speaker by measuring the resistance of the voice coil at very low frequencies (e.g., 1-30 Hz). The system 100 protects a speaker from overheating by estimating the temperature of the voice coil, and based on the estimated temperature adjusting the gain of a driver amplifier which drives the speaker.

The system 100 includes an audio source 104 which provides an audio signal Audio_Signal. The audio source 104 may, for example, be included within a processor (e.g. a digital signal processor (DSP)) or be implemented by a processor or a portable music player which provides the audio signal Audio_Signal in the audio frequency range (i.e., 40 Hz-20 kHz). The system 100 includes a pilot tone source 108 which provides a pilot tone signal Pilot_Tone. The pilot tone Pilot_Tone is a small amplitude signal (e.g., around 100 mV) having a low frequency (e.g., 1 Hz-30 Hz) or a small amplitude DC signal (e.g. 0 Hz). The audio frequency range (i.e., 40 Hz-20 kHz) and the low frequency range (i.e., 1 Hz-30 Hz) are referred to as respective first and second frequency bands.

The system 100 includes an adder 110 which has a first input 112 coupled to receive the the audio signal Audio_Signal and has a second input 114 coupled to receive the pilot tone signal Pilot_Tone. The adder 110 provides a summation signal Sum_Signal at an output 116. The Sum_Signal consists of the pilot tone signal Pilot_Tone superimposed on the audio signal Audio_Signal. The pilot tone signal Pilot_Tone is added to the audio signal Audio_Signal to ensure reliable measurement of the resistance of the speaker which is not affected by the motional impedance and inductance of the voice coil. In some implementations, the audio source 104, the pilot source 108 and the adder 112 may be combined in a single module such as a processor module.

The system 100 includes a driver amplifier 120 which has an input 122 coupled to receive the summation signal Sum_Signal. The driver amplifier 120 may comprise any type of amplifier stage such as a Class D, Class AB, Class G or Class H power amplifier stage. In an example embodiment, the output 116 of the adder 110 is coupled to the input 122 of the driver amplifier 120 via an I²S serial bus interface. In other embodiments, the audio processor may be connected to the input 122 of the amplifier 120 via any serial bus interface or other type of audio bus or audio interconnection. The driver amplifier 120 provides an amplified differential signal at outputs 124 and 126, which drives a speaker 130. The speaker 130 is an electro-acoustic transducer which has a voice coil (not shown in FIG. 1) coupled between the outputs 124 and 126. When the amplified signal is applied to the voice coil, the speaker 130 converts the signal to a corresponding sound.

The system 100 includes a current sensing circuitry 134 configured to sense current through the voice coil. In an example embodiment, the current sensing circuitry 134 does not involve a sense resistor, with an associated voltage drop and power dissipation, and thus is referred to as a lossless current sensing circuitry. The current sensing circuitry 134 provides a current sense signal I_Sense indicative of the current used to drive the voice coil. A voltage V_Sense used to drive the voice coil may be directly measured at the terminals 124 and 126. The current sense signal I_Sense is passed through a current sense channel and the voltage sense signal V_Sense is passed through a voltage sense channel.

The system 100 includes a first analog-to-digital (A/D) converter 140 on the current sense channel. The first A/D converter 140 has a first input 142 coupled to receive the current sense signal I_Sense. The first A/D converter provides a digitized current sense signal Digital_I_Sense at an output 144.

The system 100 includes a second A/D converter 148 on the voltage sense channel. The second A/D converter 148 has first and second inputs 150 and 152 coupled to receive the voltage sense signal V_Sense. The second A/D converter 148 provides a digitized voltage sense signal Digital_V_Sense at an output 154.

Since the current sensing circuitry 134 provides a single-ended signal (i.e., I_Sense) the first A/D converter 140 requires a single input (142) to receive and digitize I_Sense, but since the voltage sense signal V_Sense is a differential signal, the second A/D converter 148 requires two inputs (150, 152) to receive and digitize V_Sense.

The system 100 includes a first pre-emphasis filter 160 which has an input 162 coupled to receive the digitized current sense signal Digital_I_Sense. The first pre-emphasis filter 160 applies a gain to the signal components of the pilot tone signal Pilot_Tone (second frequency band). By way of example, the first pre-emphasis filter 160 may apply a 30 dB gain to the pilot tone signal Pilot_Tone, thus increasing its amplitude from 100 mV, for example, to 3V. As described below, by boosting the amplitude of the pilot tone signal, the system 100 provides additional quantization levels to the pilot tone signal. In order to increase the dynamic range of the pilot tone signal Pilot_Tone, the first pre-emphasis filter 160 may apply a slight attenuation to the remaining spectrum of Digital_I_Sense. By way of example, the first pe-emphasis filter 160 may apply a −3 dB gain to slightly attenuate the signal components in the first frequency band (i.e., 40 Hz-20 kHz), and thus provide additional dynamic range for the signal components in the second frequency band (i.e., 1 Hz-30 Hz). The first pre-emphasis filter 160 provides a pre-emphasized current sense signal Emp_I_Sense at an output 164.

In some implementations, the first pre-emphasis filter 160 (e.g. a digital filter) is an equalizer tuned to emphasize (i.e., boost) a second frequency band but slightly attenuate a first frequency band.

The system 100 includes a second pre-emphasis filter 170 (e.g. a digital filter) which has an input 172 coupled to receive the digitized voltage sense signal Digital_V_Sense. The second pre-emphasis filter 170 applies a gain to the signal components of the pilot tone signal Pilot_Tone (second frequency band). By way of example, the second pre-emphasis filter 170 may apply a 30 dB gain to the pilot tone signal Pilot_Tone, thus increasing its amplitude from 100 mV, for example, to 3V. In order to increase the dynamic range of the pilot tone signal Pilot_Tone on the voltage sense channel, the second pre-emphasis filter 170 may apply a slight attenuation to the remaining spectrum of Digital_V_Sense. By way of example, the second pe-emphasis filter 170 may apply a −3 dB gain to slightly attenuate the signal components in the first frequency band (i.e., 40 Hz-20 kHz), and thus provide additional dynamic range for the signal components in the second frequency band (i.e., 1 Hz-30 Hz). The second pre-emphasis filter 170 provides a pre-emphasized voltage sense signal Emp_V_Sense at an output 174.

The system 100 includes a first quantizer module 178 which has an input 180 coupled to receive the pre-emphasized current sense signal Emp_I_Sense. The first quantizer module 178 maps the pre-emphasized signal Emp_I_Sense to a quantized current sense signal Quant_I_Sense and provides Quant_I_Sense at an output 182.

The system 100 includes a second quantizer module 184 which has an input 186 coupled to receive the pre-emphasized voltage sense signal Emp_V_Sense. The second quantizer module 184 maps the pre-emphasized signal Emp_V_Sense to a quantized voltage sense signal Quant_V_Sense and provides Quant_V_Sense at an output 188.

In an example embodiment, the first and second quantizer modules 178 and 184 map an input which has a large number of elements (i.e., large data set) to an output which has a small number of elements (i.e., small data set). In some implementations, the quantizer modules 178 and 184 are 8-bit quantizers.

In an example embodiment, the system 100 includes a first de-emphasis filter 190 which has an input 192 coupled to the output 182 of the first quantizer module 178, and includes a second de-emphasis filter 194 which has an input 196 coupled to the output 188 of the second quantizer module 184.

In some implementations, the input 192 of the first de-emphasis filter 190 is coupled to the first quantizer module 178 via an FS serial bus interface, and the input 196 of the second de-emphasis module 194 is coupled to the second quantizer module 184 via an FS serial bus interface. In other embodiments, the connections between output 182/input 192 and output 188/input 196 are implemented using another type of bus (such as a serial bus) or other type of interconnection.

In some implementations, the first and second A/D converters 140, 148, the first and second pre-emphasis filters 160, 170, and the first and second quantizers 178, 184 are implemented in an integrated circuit while the first and second de-emphasis filters 190, 194 are implemented in another integrated circuit. As a result, the serial communication between the first quantizer 178 and the first de-emphasis filter 190 and the serial communication between the second quantizer 184 and the second de-emphasis filter 194 is limited by the bandwidth of the communication interface used to couple the quantizers 178 and 184 to the de-emphasis filters 190 and 194. In many instances, the serial communication between the quantizers and the de-emphasis filters is limited by the bandwidth of the I²S serial bus interface which allows only 8-bits transmission, thus requiring the 8-bits quantizers 178 and 184.

As noted before, the system 100 is configured to estimate the temperature of a voice coil of a speaker by measuring the resistance of the voice coil at very low frequencies (e.g., 1-30 Hz). Based on the estimated temperature of the voice coil, the system 100 adjusts the gain of the driver amplifier 120, thus protecting the speaker from overheating.

In many applications, in order to protect the speaker from overheating, the temperature must be controlled with a high-degree of accuracy. In some applications, for example, the temperature must be controlled within +/−1 degree Celcius of the recommended operating temperature. Because the pilot tone signal Pilot_Tone is used to estimate the DC resistance, the pilot tone signal Pilot_Tone must be represented in high resolution so that the temperature can be controlled accurately. If the pilot tone signal Pilot_Tone is not represented in high resolution, the resulting estimated temperature may have a wide range of error.

As discussed before, the pilot tone signal Pilot_Tone generated by the pilot tone source 108 is a small amplitude signal (e.g., 100 mV) in order to prevent audible noise. Without the gain applied to the pilot tone signal in the subsequent stage by the pre-emphasis filters 160 and 170, the pilot tone signal Pilot_Tone cannot be represented with a high degree of resolution because the quantizers 178 and 184 provide only 8-bit outputs.

Figure 2A:
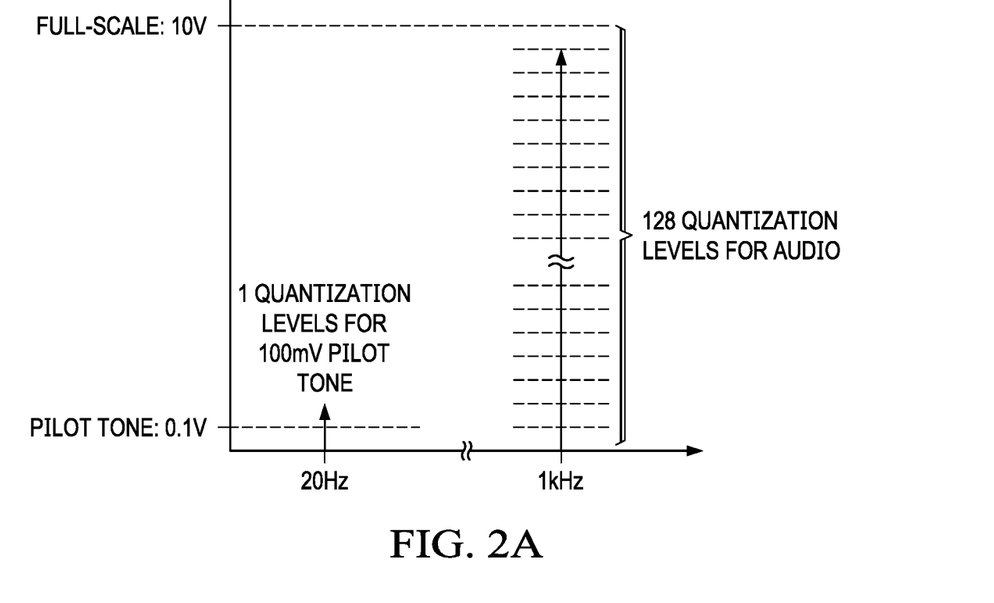
FIGS. 2A-2C are graphs illustrating operation of a pre-emphasis filter.
Figure 2B:
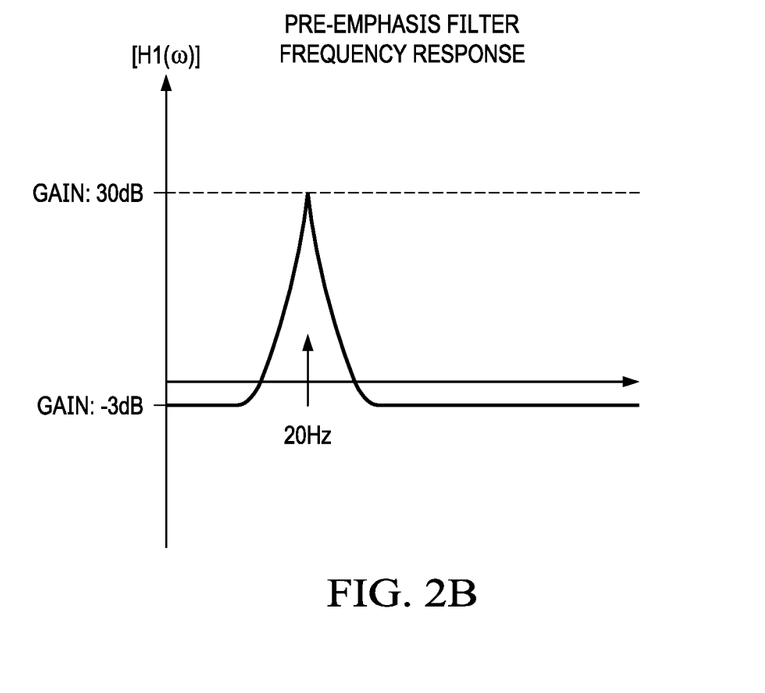
Figure 2C:
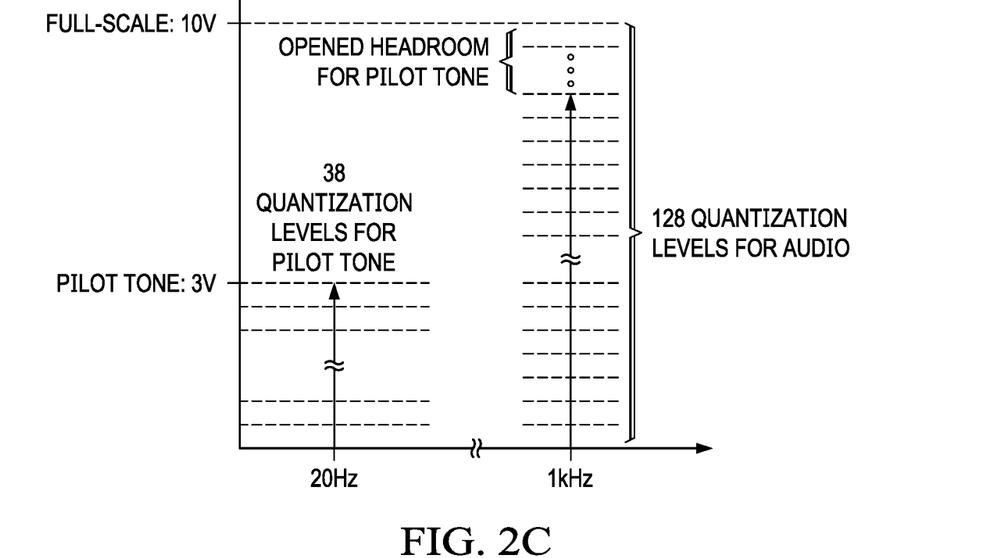

FIGS. 2A-2C illustrate operation of the pre-emphasis filter 160 on the current sense channel or the pre-emphasis filter 170 on the voltage sense channel to increase the amplitude of the pilot tone signal Pilot_Tone in order to provide more quantization levels to represent the signal. In FIG. 2A, a 100 mV pilot tone signal Pilot_Tone (current sense channel or voltage sense channel) and a 9.8V audio signal Audio_Signal (current sense channel or voltage sense channel) are shown in frequency domain. The pilot tone signal is centered at 20 Hz and the audio signal Audio_Signal is centered at 1 kHz. In FIG. 2A, the horizontal axis represents the frequency and the vertical axis represents the voltage.

Because the quantizers 178 and 184 provide 8-bit outputs, there are only 128 quantization levels available to represent the pilot tone signal and the audio signal (1 bit is left for the sign). Since the pilot tone signal is a small amplitude signal (i.e., 100 mV), only 1 quantization level out of 128 levels is available to represent the pilot tone signal. As a consequence, the estimated temperature of the voice coil may include a large error, which may result in overheating of the speaker.

In FIG. 2B, in order to increase the number of quantization levels available to represent the pilot tone signal, the pre-emphasis filter 160 or 170 applies a 30 dB gain to the pilot tone signal, thus increasing the amplitude of the pilot tone signal from 100 mV to 3V. The horizontal axis represents the frequency and the vertical axis represents the gain. As a result, a higher number of quantization levels are available to represent the pilot tone signal as shown in FIG. 2C, and thus the pilot tone signal can be represented in higher resolution. In FIG. 2C, the horizontal axis represents the frequency and the vertical axis represents the voltage. Thus, the temperature of the voice coil may be estimated with a high degree of accuracy and the speaker can be protected from overheating.

Since the pilot tone signal is super imposed on the audio signal, increasing the amplitude of the pilot tone signal may saturate the quantizer 178 or 184. To prevent a saturation of the quantizer 178 or 184, the pre-emphasis filter 160 or 170 applies a slight attenuation to the audio signal, thus decreasing the amplitude of the audio signal to prevent a saturation of the quantizer 178 or 184.

Figure 3A:
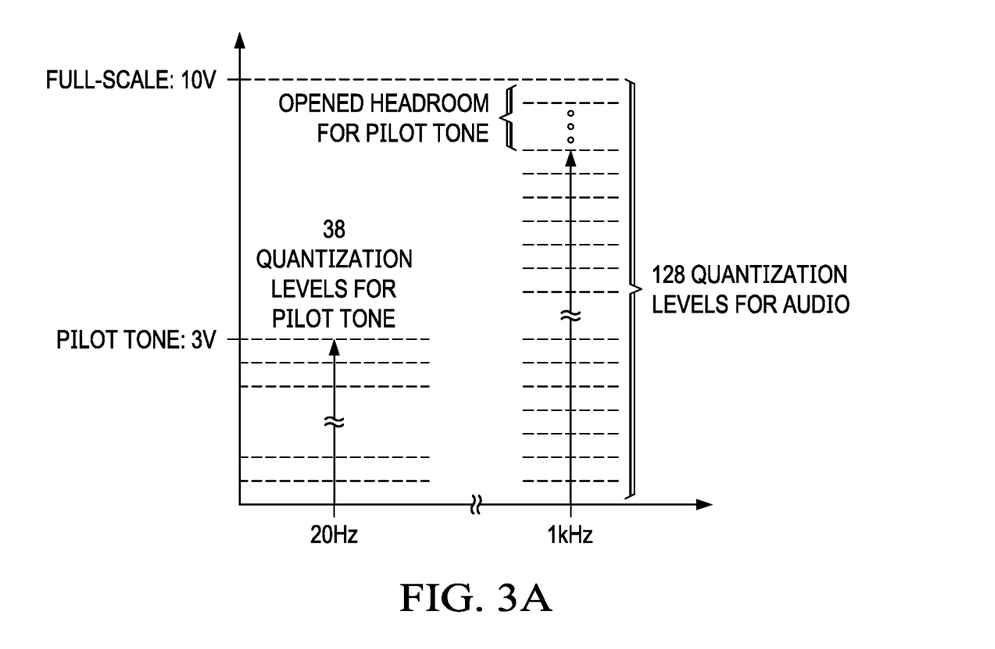
FIG. 3A-3C are graphs illustrating operation of a de-emphasis filter.
Figure 3B:
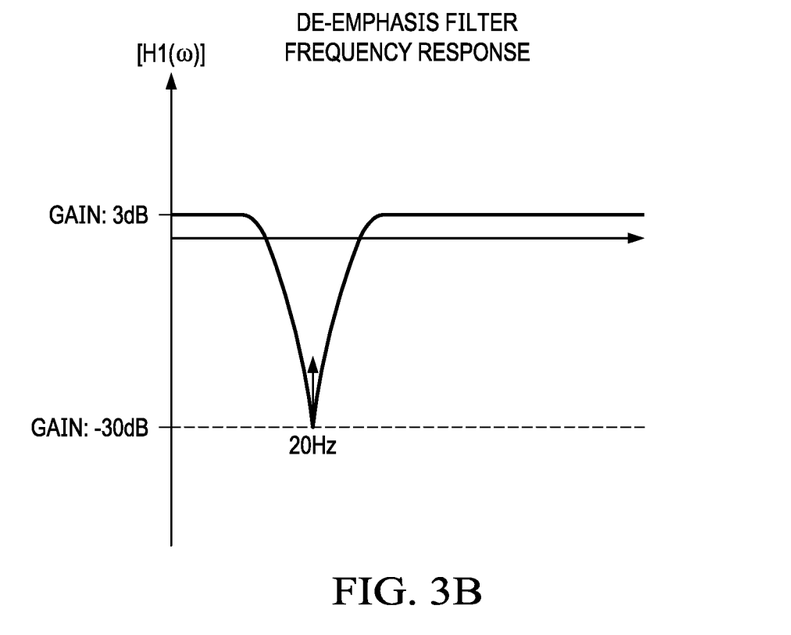
Figure 3C:
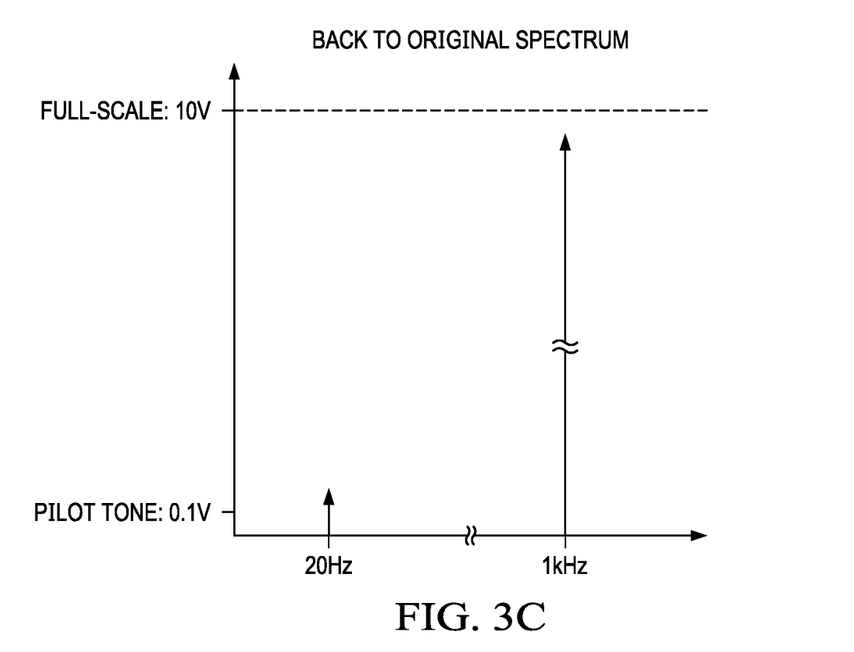

FIG. 3A-3C illustrate operation of the de-emphasis filter 190 on the current sense channel or the de-emphasis filter 194 on the voltage sense channel to reverse the emphasis on the pilot tone signal and to provide an overall flat frequency response. In FIGS. 3A and 3C, the horizontal axes represent the frequency and the vertical axes represent the voltage, and in FIG. 3B, the horizontal axis represents the frequency and the vertical axis represents the gain. In FIG. 3A, the pilot tone signal Pilot_Tone and the audio signal Audio_Signal are shown in frequency domain following transmission to the de-emphasis filter 190 or 194 over the I2S serial bus interface.

In FIG. 3B, the de-emphasis filter 190 or 194 applies a −30 dB gain to the pilot tone signal. Thus, the frequency response of the de-emphasis filter 190 or 194 is inverse of the frequency response of the pre-emphasis filter 178 or 184. As the pilot tone signal passes through the de-emphasis filter 190 or 194, the pilot tone signal is attenuated down to its original amplitude (100 mV in case of the voltage sense). The de-emphasis filter 190 or 194 also applies a slight gain to the audio signal to restore the audio signal back to its original amplitude.

The system 100 includes an impedance estimation module 1004 which has a first input 1006 coupled to receive the de-emphasized current signal De_Emp_I and a second input 1008 coupled to receive the de-emphasized voltage signal De_Emp_V. The impedance estimation module 1004 provides an estimated resistance value Re.

In some embodiments, the system 100 does not include the de-emphasis filters 190 and 194. In those embodiments, the output Quant_I_Sense of the first quantizer module 178 and the output Quant_V_Sense of the second quantizer module 184 are directly provided to the impedance estimation module 1004 which estimates the resistance of the voice coil. In some embodiments, the impedance estimation module 104 is configured to estimate the resistance based on Quant_I_Sense and Quant_V_Sense and the gains applied by the pre-emphasis filters 160 and 170.

In an example embodiment, the impedance estimation module 1004 derives an estimated voltage at the second frequency band (i.e., pilot tone) and an estimated current at the second frequency band. Based on a ratio of the estimated voltage and estimated current at the second frequency band, the impedance estimation module 1004 estimates the resistance Re of the voice coil.

In an example embodiment, the estimated resistance Re may be provided to a temperature estimation module 1010 which is configured to estimate the temperature Tc of the voice coil. The temperature estimation module 1010 may determine the temperature Tc based on Re and at least one reference value, e.g., ratio of resistance at a known temperature. The estimate of the temperature Tc may be provided to a gain control module (not shown in FIG. 1) which may generate appropriate gain control signals to control the driver amplifier 120.

In some implementations, the functions of the impedance estimation module 1004 and the functions of the temperature estimation module 1010 may be combined in a single module.

In some implementations, the pilot tone signal may be applied continuously or frequently during operation of the speaker to allow continuous or frequent monitoring of the temperature of the voice coil.

The impedance estimation module 1004 and the temperature estimation module 1010 refer to functional units which may be implemented by dedicated hardware components such as an application specific integrated circuit (ASIC) or a general purpose processor or they may be implemented by software.

Figure 4:
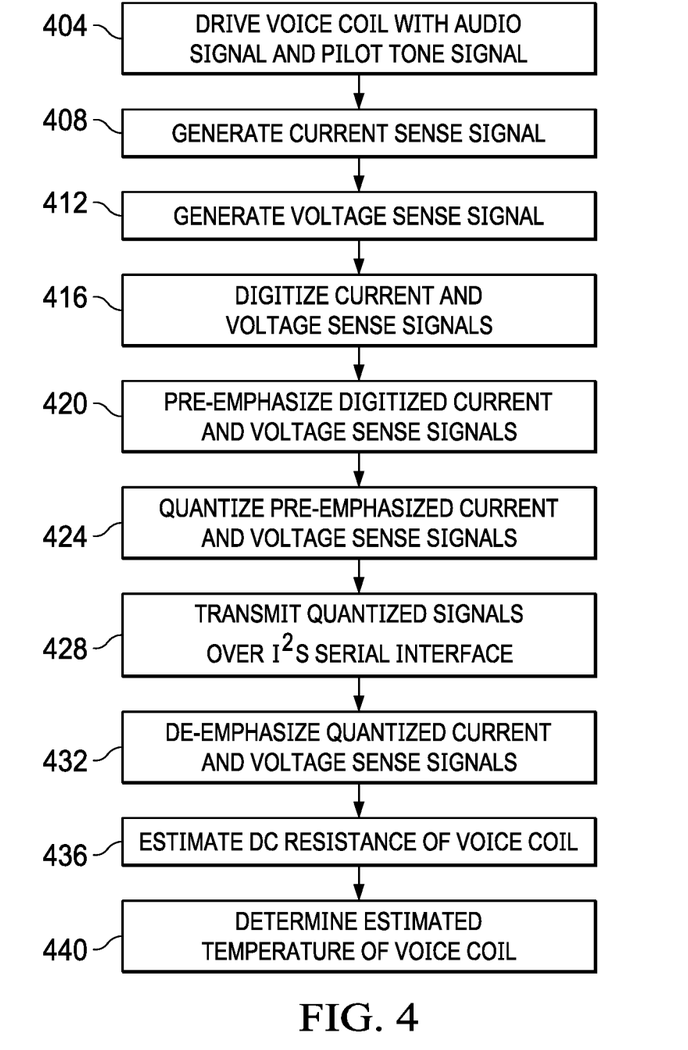
FIG. 4 is a flow diagram of a method of an example embodiment.

FIG. 4 is a flow diagram of a method of an example embodiment. In block 404, a voice coil of a speaker is driven with signal components at first and second frequency bands. The first frequency band has a range of 40 Hz-20 kHz, and the second frequency band has a range of 1 Hz-30 Hz.

In block 408, a current sense signal is generated. The current sense signal indicates current through the voice coil.

In block 412, a voltage sense signal is generated. The voltage sense signal indicates a voltage across the voice coil.

In block 416, the current sense signal and the voltage sense signal are digitized. The current sense signal may be digitized by a first A/D converter and the voltage sense signal may be digitized by a second A/D converter.

In block 420, the digitized current and voltage sense signals are pre-emphasized. A first pre-emphasizer may be used to apply a first attenuation to the signal components of the digitized current sense signal at the first frequency band and apply a first gain to the signal components of the digitized current sense signal at the second frequency band. A second pre-emphasizer may be used to apply a first attenuation to the signal components of the digitized voltage sense signal at the first frequency band and apply a first gain to the signal components of the digitized voltage sense signal at the second frequency band.

In block 424, the pre-emphasized current and voltage sense signals are mapped to quantized current and voltage signals. A first quantizer may be used to map the pre-emphasized current sense signal to the quantized current signal, and a second quantizer may be used to map the pre-emphasized voltage sense signal to the quantized voltage signal. The first and second quantizers map an input which has a large number of elements (i.e., large data set) to an output which has a small number of elements (i.e., small data set).

In block 428, the quantized current and voltage signals are transmitted over first and second serial bus interfaces, respectively. In some implementations, the first and second serial bus interfaces are I$^2$S serial bus interfaces. In some implementations, the current and voltage sense signals are transmitted on the same I$^2$S bus using time division multiplexing (TDM).

In block 432, the current and voltage sense signals are de-emphasized. A first de-emphasis filter may be used to apply a second gain to the signal components of the quantized current signal at the first frequency band and apply a second attenuation to the signal components of the quantized current signal at the second frequency band. A second de-emphasis filter may be used to apply a second gain to the signal components of the quantized voltage signal at the first frequency band and apply a second attenuation to the signal components of the quantized voltage signal at the second frequency band.

In block 436, the resistance of the voice coil is estimated based on the de-emphasized current and voltage sense signals. In block 440, an estimated temperature of the voice coil is determined based on the resistance of the voice coil.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means +/−10 percent of the stated value.

Modifications are possible in the described embodiments, and other embodiments are possible, within the scope of the claims.

What is claimed is:

1. A system for determining the temperature of a voice coil of a speaker when the voice coil is being driven by a signal having a first portion of the signal in a first frequency band and a second portion of the signal in a second frequency band different than the first frequency band, the system comprising;
    a first input coupled to receive a current sense signal indicative of current through the voice coil when the voice coil is being driven by the signal;
    a second input coupled to receive a voltage sense signal indicative of a voltage across the voice coil when the voice coil is being driven by the signal;
    a first analog-to-digital (A/D) converter having an input coupled to receive the current sense signal and operable to provide a digitized current sense signal;
    a second A/D converter having an input coupled to receive the voltage sense signal and operable to provide a digitized voltage sense signal;
    a first pre-emphasis filter having an input coupled to receive the digitized current sense signal, the first pre-emphasis filter operable to apply a gain to the digitized current sense signal in the second frequency band and to output such amplified pre-emphasized current sense signal;
    a second pre-emphasis filter having an input coupled to receive the digitized voltage sense signal, the second pre-emphasis filter operable to apply a gain to the digitized voltage sense signal in the second frequency band and to output such amplified pre-emphasized voltage sense signal;
    a first quantizer module having an input coupled to receive the amplified pre-emphasized current sense signal and operable to map the amplified pre-emphasized signal to a quantized current sense signal; and
    a second quantizer module having an input coupled to receive the amplified pre-emphasized voltage sense signal and operable to map the amplified pre-emphasized voltage sense signal to a quantized voltage sense signal.

2. The system of claim 1, wherein the first pre-emphasis filter is operable to apply an attenuation to the signal components at the first frequency band.

3. The system of claim 2, wherein the temperature estimation module is configured to estimate the temperature of the voice coil based on the resistance of the voice coil and at least one reference value.

4. The system of claim 2, wherein the first quantizer module is coupled to the first de-emphasis filter via an I$^2$S serial bus interface.

5. The system of claim 2, wherein the second quantizer module is coupled to the second de-emphasis filter via an I$^2$S serial bus interface.

6. The system of claim 1, wherein the second pre-emphasis filter is operable to apply an attenuation to the signal components at the first frequency band.

7. The system of claim 1, further comprising:
    a first de-emphasis filter having an input coupled to receive the quantized current sense signal, the first de-emphasis filter operable to apply an attenuation to the signal components at the second frequency band and to provide a de-emphasized current sense signal;
    a second de-emphasis filter having an input coupled to receive the quantized voltage sense signal, the second pre-emphasis filter operable to apply an attenuation to the signal components at the second frequency band and to provide a de-emphasized voltage sense signal;
    an impedance estimation module having a first input coupled to receive the de-emphasized current sense signal and a second input coupled to receive the de-emphasized voltage sense signal, the impedance estimation module operable to determine an estimated resistance of the voice coil based on the de-emphasized voltage and current sense signals; and
    a temperature estimation module configured to determine an estimated temperature of the voice coil based on the resistance of the voice coil.

8. The system of claim 7, wherein the first de-emphasis filter is operable to apply a gain to the signal components at the first frequency band.

9. The system of claim 7, wherein the second de-emphasis filter is operable to apply a gain to the signal components at the first frequency band.

10. The system of claim 1, wherein the second frequency band has a range of 1 Hz-30 Hz.

11. The system of claim 1, wherein the first frequency band has a range of 40 Hz-20 kHz.

12. A system for determining the temperature of a voice coil of a speaker when the voice coil is being driven by a signal having an audio portion in a first frequency band and a pilot tone portion in a second frequency band different than the first frequency band, the system comprising;
- a first input coupled to receive a current sense signal indicative of current through the voice coil when the voice coil is being driven by the signal;
- a second input coupled to receive a voltage sense signal indicative of the voltage across the voice coil when the voice coil is being driven by the signal;
- a first analog-to-digital (A/D) converter having an input coupled to receive the current sense signal and operable to provide a digitized current sense signal;
- a second A/D converter having an input coupled to receive the voltage sense signal and operable to provide a digitized voltage sense signal;
- a first pre-emphasis filter having an input coupled to receive the digitized current sense signal, the first pre-emphasis filter operable to apply a gain to the pilot tone signal and to provide a pre-emphasized current sense signal;
- a second pre-emphasis filter having an input coupled to receive the digitized voltage sense signal, the second pre-emphasis filter operable to apply a gain to the pilot tone signal and to provide a pre-emphasized voltage sense signal;
- a first quantizer module having an input coupled to receive the pre-emphasized current sense signal and operable to map the pre-emphasized signal to a quantized current sense signal;
- a second quantizer module having an input coupled to receive the pre-emphasized voltage sense signal and operable to map the pre-emphasized signal to a quantized voltage sense signal;
- a first de-emphasis filter having an input coupled to receive the quantized current sense signal, the first de-emphasis filter operable to attenuate the pilot tone signal and to provide a de-emphasized current sense signal;
- a second de-emphasis filter having an input coupled to receive the quantized voltage sense signal, the second pre-emphasis filter operable to attenuate the pilot tone signal and to provide a de-emphasized voltage sense signal;
- an impedance estimation module having a first input coupled to receive the de-emphasized current sense signal and a second input coupled to receive the de-emphasized voltage sense signal, the impedance estimation module operable to determine an estimated resistance of the voice coil based on the de-emphasized voltage and current sense signals; and
- a temperature estimation module configured to determine an estimated temperature of the voice coil based on the resistance of the voice coil.

13. The system of claim 12, wherein the first pre-emphasis filter is operable to apply an attenuation to the signal.

14. The system of claim 12, wherein the second pre-emphasis filter is operable to apply an attenuation to the signal.

15. The system of claim 12, wherein the first de-emphasis filter is operable to apply a gain to the signal.

16. The system of claim 12, wherein the second de-emphasis filter is operable to apply a gain to the signal.

17. The system of claim 12, wherein the pilot tone portion has a range of 1 Hz-30 Hz.

18. The system of claim 12, wherein the audio portion has a range of 40 Hz-20 kHz.

19. A method of determining the temperature of a voice coil of a speaker, comprising:
- driving the voice coil with a signal components having a first portion in a first frequency band and a second portion in a second frequency band that is different than the first frequency band;
- generating a current sense signal indicating current through the voice coil;
- generating a voltage sense signal indicating a voltage across the voice coil;
- digitizing the current sense signal and the voltage sense signal;
- pre-emphasizing the digitized current signal and the voltage sense signal by attenuating the first portion of the signal by a first attenuation and amplifying the second portion of the signal by a first gain;
- mapping the pre-emphasized current sense signal and the voltage sense signal to create a quantized current sense signal and a quantized voltage sense signal, the quantized current sense signal and the quantized voltage sense signal having a smaller set of values than the respective pre-emphasized current sense signal and pre-emphasized voltage sense signal; and
- providing the quantized current sense signal and the quantized voltage sense signal to a temperature estimation module.

20. The method of claim 19, further comprising:
- receiving the quantized current and voltage sense signals;
- de-emphasizing the current and voltage sense signals by applying a second gain to the signal components at the first frequency band and applying a second attenuation to the signal components at the second frequency band;
- estimating the resistance of the voice coil based on the de-emphasized current and voltage sense signals; and
- determining an estimated temperature of the voice coil based on the resistance of the voice coil.

21. The method of claim 19, wherein the estimated temperature of the voice call is determined based on the impedance of the voice call and at least one reference value.

22. The method of claim 19, wherein the first frequency band is between 40 Hz and 20 kHz.

23. The method of claim 19, wherein the second frequency band is between 1 Hz and 30 Hz.

* * * * *